US007587991B2

(12) United States Patent
Buck et al.

(10) Patent No.: US 7,587,991 B2
(45) Date of Patent: Sep. 15, 2009

(54) SUPPORT DEVICE FOR THE CULTIVATION OF MACRO ORGANISMS IN MARINE WATERS

(75) Inventors: Bela Hieronymus Buck, Bremen (DE); Cornelia Maria Buchholz, Helgoland (DE)

(73) Assignee: Stiftung Alfred - Wegener - Institut Fuer Polar - und Meeresforschung, Bremerhaven (DE)

( * ) Notice: Subject to any disclaimer, the term of this patent is extended or adjusted under 35 U.S.C. 154(b) by 13 days.

(21) Appl. No.: 10/590,879

(22) PCT Filed: Feb. 11, 2005

(86) PCT No.: PCT/DE2005/000234

§ 371 (c)(1),
(2), (4) Date: Aug. 27, 2006

(87) PCT Pub. No.: WO2005/082129

PCT Pub. Date: Sep. 9, 2005

(65) Prior Publication Data

US 2007/0193115 A1      Aug. 23, 2007

(30) Foreign Application Priority Data

Feb. 29, 2004    (DE) ...................... 10 2004 010 652

(51) Int. Cl.
*A01K 61/00*    (2006.01)
(52) U.S. Cl. ..................... 119/239; 119/234; 119/238; 119/241
(58) Field of Classification Search .................. 119/234, 119/238, 239, 241; 47/1.4
See application file for complete search history.

(56) References Cited

U.S. PATENT DOCUMENTS 3,675,626 A * 7/1972 Down .......................... 119/238

(Continued)

FOREIGN PATENT DOCUMENTS

JP            11196696 A       7/1999

(Continued)

OTHER PUBLICATIONS

Abschlussbericht zum Vorhaben 03F0096A: Massenkultur mariner Makroalgen bei Helgoland zur Gewinnung von Phykokolloiden und zur Verwendung als Biosorptionsmittel.

(Continued)

*Primary Examiner*—Michael R Mansen
*Assistant Examiner*—Brian M O'Hara
(74) *Attorney, Agent, or Firm*—Darby & Darby

(57) ABSTRACT

A support device for cultivating macro organisms in marine waters consisting of first and second coplanar rings connected to each other by a plurality of radial support lines and provided between them with a plurality of cultivating lines arranged in substantially coaxial rings and connected to the support lines. The outer one of the first and second rings is held in a predetermined orientation by ropes of crow's foot arrangements connected to it from above and below the rings. Each crow's foot arrangement is provided with a ring coaxial with respect to the first and second rings and connected to the other by a support rope. One of the crow's foot rings is connected to a buoyancy means and the other one is connected to an anchoring device so that forces acting on the buoyancy or anchoring means are restricted to the support rope.

20 Claims, 2 Drawing Sheets

U.S. PATENT DOCUMENTS

| | | | | |
|---|---|---|---|---|
| 3,853,095 | A | * | 12/1974 | Lawrence .................. 119/238 |
| 3,870,019 | A | * | 3/1975 | McNicol .................... 119/241 |
| 4,377,987 | A | * | 3/1983 | Satre ........................ 119/241 |
| 5,309,672 | A | * | 5/1994 | Spencer et al. ................ 47/1.4 |
| 6,119,630 | A | * | 9/2000 | Lobsiger et al. ............ 119/238 |
| 6,539,894 | B1 | * | 4/2003 | Byrne et al. ................ 119/234 |
| 6,578,523 | B2 | * | 6/2003 | Gagnon ..................... 119/234 |
| 6,978,735 | B1 | * | 12/2005 | Yeager ...................... 119/221 |
| 2006/0037551 | A1 | * | 2/2006 | Quinta Cortinas et al. .. 119/238 |

FOREIGN PATENT DOCUMENTS

| | | | | |
|---|---|---|---|---|
| JP | 2000125694 | A | * | 5/2000 |
| JP | 2001054330 | A | | 2/2001 |
| WO | WO 86/02395 | | | 4/1986 |
| WO | WO 8602395 | A | * | 4/1986 |

OTHER PUBLICATIONS

Stifung Alfred-Wegener-Institut fuer Polar- und Meeresforschung: Research Highlights 2002: "Combined utilisation of wind farming and mariculture in the North Sea" y Bela Hieronymus Buck.

Berichte zur Polar-Meeresforschung 412/2002: "Open Ocean Aquaculture and Offshore Windparks . . . " by Bela Hieronymus Buck.

* cited by examiner

SUPPORT DEVICE FOR THE CULTIVATION OF MACRO ORGANISMS IN MARINE WATERS

BACKGROUND OF THE INVENTION

1. Field of the Invention

The invention relates to a support device for the cultivation of Macro organisms in marine waters with at least one ring structure disposed below the surface of the water between at least one buoyancy device and an anchoring device and provided, within a closed outer ring, with a cobwebby cultivation unit of radial support lines and azimuthal cultivation lines.

2. The Prior Art

Primary among the Macro organisms which can be cultivated in marine waters, such as the seas and oceans, are the algae (macro algae such as brown, green and red algae) and mussels (such as blue mussels and oysters). In east Asia the cultivation of algae has a long tradition, with the requisite experience extending back several centuries. However, it is depending upon using such areas of the sea which are substantially and well protected from rough weather and marine conditions, such as bays or estuaries. Long lines, rafts or pole systems constitute the major support devices for algae cultures. They are anchored at the bottom and are quite prone to suffer from rough seas. Areas of the sea subject to harsh weather conditions have heretofore scarcely been used for the marine cultivation of any potentially useful marine organisms. Only a few years ago marine cultivation, because of conflicts in coastal regions between users and consequential complicated legal conditions, urban waste water as well as better oxygen conditions, began to extend to the offshore regions of the oceans. In Germany, submersible cages for the cultivation of salt water fish in the offshore region were developed as early as the 1970s, and further developments were later used in Canada and the USA. Such systems are still in the pilot stages. However, the primary purposes of cultivating macro algae in regions of unfavorable weather conditions were for research. Mention is here to be made of a project of the Isle of Man where different structures, especially long-line techniques, were utilized. Further more, from the Japanese abstract of JP 2001054330 A there is known a dive cage structure for algae cultivation in the sea at depths of 10 m to 25 m and in which a plurality of braces and ropes is disposed as a cultivation unit between floodable containers at the corners of the structure. Lowering and hoisting of the structure takes place by evacuating and flooding the corner containers and by direct engagement of the unstable cultivation unit. A pole-like sticking structure with algae cultures imbedded in an eyelet is known from Japanese abstract JP 11196696 A which is stuck into the bed of the sea. Furthermore, from WO 86/02395 it is known to attach the lower end of laminar algae cultures to a stake in the sea bed by a multiple rope arrangement. However, this structure can only be used near the coast and is unsuitable for use in heavy seas.

In Germany, too, tests were conducted during the years between 1994 and 1996 to cultivate macro algae neat Heligoland under North Sea conditions. This was a project "Mass culture of marine macro algae near Heligoland for producing phyco-colloids and for use as biosorption means" by Luening and Buchholz sponsored by the (German) Federal Ministry of Education and Research (see Final Report relating to project 03F0096A, 1996, Part 1). For the experiments, different support devices of long-line, ladder and lattice structured were developed for cultivating the macro algae *Laminaria saccharina* and *Laminaria digitata*. However, none of these structures were capable of withstanding the oceanographic conditions near Heligoland. This was the first time that attempts were made to build, and to use at different sites, an ring structure for the cultivation of laminaria species. However, under the pressure of the strong and permanent currents a large number of these rings were destroyed. Other rings which resisted the effects displayed partially atrophied growth. Attempts to build a support device of ring structure in the more protected harbor entrance in order to avoid the force of waves and currents initially resulted in successful longitudinal growth of the algae. However, they quickly atrophies since because of the low current various parasites, animals and other algae settled on the leaves so that they broke off which even led to negative rates of growth. It became apparent that the algae which in nature can only be found at exposed sites required exposure to certain currents.

The support devices known from the Final Report (see its pages 6 to 9 and FIGS. 12 to 16 and 18) are the ones of various ring structures. Among others, tests were made with an ring structure disposed below the water surface and made of a single PE plastic tube as the external ring of a diameter of 5 m. The external ring was provided with 80 m of cultivation line in a cobwebby arrangement. The cultivation line serves to grow the Macro organisms which may either be caught from the sea (e.g. mussel larvae) or be imbedded into the cultivation line as culture seed (e.g. algae seed). Buoyancy was ensured by eight fenders (23 kg each) as buoyancy means which were evenly distributed on the external ring and which also served as markers. They were found to suffer from the disadvantage of the radially arranged fenders, contrary to assumptions, being incapable of maintaining the ring structure in a horizontal position even at strong currents. Individual fenders could not support the ring structure in strong currents and were pushed below the surface of the water. This subjected the fenders increasingly to compression and relief and to their partial destruction. The anchoring system was conceived such that the entire ring structure had to be disassembled for harvesting. To this end one of the eight fenders of the ring structure had to be engaged and hoisted from a ship. This caused the external ring to be rotated to an orientation vertically of the water surface which when the external ring touched the hull of the ship often resulted in the loss of the algae. Recovering the ring structure by way of several roped connected to the circumference also proved to be disadvantageous since it caused strong deformations of the algae growth covered ring structure. In most cases it was necessary to release the ring structure in order to tow into the protected harbor for harvesting. Moreover, the fenders could become entangle with each other and thus cause the free ropes to become damaged by abrasion.

A first possible yet theoretical further development of the described support device of ring structure may be taken from the AWI Publication "Beispiele aus unserer Forschung 2002" (Examples from our Research 2002), pages 33 to 39 under the title "Kombinierte Windpark- und Marikulturnutzung in der Nordsee" (Combined Wind Park and Marine Culture Use in the North Sea) by B. H. Buck which was based on a previously executed feasibility study (Berichte zur Polar- und Meeresforschung [Reports on Polar and Ocean Research] Apr. 12, 2002, Chapter 6, pages 74-85.The rings and long lines disclosed by the AWI publication constitute possibilities of cultivation and are mere theory. At present, no wind parks are existing. The schematic presentation in accordance with FIG. 9*b* discloses an arrangement of a support device with an ring structure in an offshore region in which the support device is maintained stationary 1.5 m to 5 m below the surface of the sea between the pylon of a wind energy plant and an anchoring arrangement made up of an anchor chain and an anchor stone. In that arrangement, the two arresting points are affixed to the outermost points on the external ring of the ring structure. An arrangement of two anchoring points with brackets at the external ring (FIG. 9b) is as possible as is an aggregate of several ring structures around the pylon (FIG. 9a). Again, the closed external ring is provided with a cobwebby cultivation unit consisting of radial support lines and azimuthal cultivation lines, the hub being formed by a common knob.

By the last-described support devices with ring structures of one or more external rings being the closest prior art from which the present application is proceeding, the possibility is to be provided, particularly in offshore regions, of cultivating Macro organisms in protected and unprotected regions of the sea where medium to strong currents as well as periods of high waves prevail, or may temporarily occur. In Europe, protected and substantially unprotected regions exist in all areas of the exclusive economic zone and at almost all locations of the coastal sea. Since the coastal sea for reasons of user conflicts and nature preservation can hardly be used at all, the indications of aqua culture are that more and more exposed and substantially open (unprotected) areas of the sea will gradually be used.

OBJECT OF THE INVENTION

The object of the invention is thus to be seen in so to improve a support device of the kind described supra that it can be used under critical conditions in protected as well as unprotected offshore regions. In this connection, consideration is to be given to simple operation of support devices of different sizes, to a user-friendly and cost-efficient construction as well as to the possibility of easily positioning and recovering the support device, to maintain the device, and to plant and harvest cultivated Macro organisms at any point in time of their market-readiness. Damage to the support device is to be substantially avoided at any time of its operation.

SUMMARY OF THE INVENTION

In the accomplishment of this object, the support device in accordance with the invention thus provides for the external ring connected by an upper crow's foot to a central buoyancy means and by a lower crow's foot to an anchoring device, each crow's foot being constructed of a central crow's foot ring and a plurality crow's foot ropes evenly connected to the circumference of the external ring and extending upwardly to and downwardly from common connecting points, that the radial support lines are tautly connected to a central internal ring and that the central buoyancy means is connected directly to the anchoring device by at least one central support rope extending through the central internal ring and connected to the two crow's foot rings.

The advantages of the invention reside in the special design of individual component parts and their operating principle. Among these are the structure and realization of the anchoring, of the ring structure, and of the buoyancy means. As a result of these designs, the safe placement in, as well as the safe harvest of Macro organisms, e.g. algae, on the sea was ensured. Further maintenance and recovery operations can be easily performed; damage, destruction or even loss of the entire support device or of any of its components is safely avoided. Regions of the open sea which heretofore could not be utilized have now become useful for the effective cultivation of Macro organisms because of the support device in accordance with the invention. As a result of its special structural components, the support device according to the invention can be employed in the inshore and offshore regions. Its one-point anchoring allows it to remain movable in the water column. Sufficient fresh nutrients and plankton are made available to the Macro organisms in the ring structure as a result of the drifting circle and the diagonal disposition the current direction. During hoisting, the special structure maintains its horizontal disposition and thus significantly simplifies the harvest and maintenance.

For this purpose, the support structure according to the invention is built such that a direct connection is provided by at least one central support rope between the buoyancy means and the anchoring device. If the central buoyancy means is hoisted, for instance for towing the entire support device in case of a planned change of location or harvesting algae, no tractive forces are introduced into the ring structure. Forces which because of currents or waves affect the buoyancy means and/or the ring structure or which are generated by the weight of the ring structure, are transmitted directly to the anchoring device by the central rope or ropes. The ring structure with its cultivation unit of radial support lines and azimuthal cultivation lines is suspended from the vertical anchoring devices by a double crow's foot, the upper crow's foot being attached to the central buoyancy means and the external ring by several crow's foot ropes, and a further, lower crow's foot also connecting the external ring to a lower connecting point at the central support rope. The upper crow's foot supports the weight of the ring structure and algae cultures; the lower crow's foot prevents the ring structure from being pulled away by the central buoyancy means in case it is dragged in a strong current and is disposed diagonally in the water column. At this point it is to be mentioned, that while constant mention has been made of a "ring structure" and an "external ring", this is by no means to refer to a circular shape. Any polygons, e.g. of an easily connectable honeycomb shape, are also to be encompassed by the term "ring structure". When choosing this term, it was important to connote a closed structure in contrast to the known line and lattice structures.

Forces generated by currents and waves do affect the ring structure notwithstanding the suspension system including the two crow's feet, but this cannot be avoided in the rough offshore regions. In order to prevent deformation of the ring structure by such forces, which increase at short wave frequencies in particular, one embodiment of the invention may advantageously provide for the formation of each mounting bracket at the external ring as a rigid sleeve provided with eyelets for each of the upper and lower crow's foot ropes as well as for the radial support line. Associated crow's foot ropes extending from above and below are always arranged in pairs at a sleeve. Thus if forces from a crow's foot rope of the upper crow's foot act upon the external ring, such forces would be transferred to the associated lower crow's foot rope by way of the sleeve. The width selected for the sleeve can further augment the force transfer action. This also true of the material of the rigid sleeve which may be made of steel as well as of high-strength plastic, e.g. PP, PE or PFT. Where steel is used various eyelets may be attached to the sleeve by welding without any complications, and corrosion in sea water can be avoided.

The centripetally tensioned support lines, to which the closed cultivation lines are attached inwardly of the external ring, are connected, toward the center, to a central internal ring. In this manner and independently of the load of the anchoring, collaboration of the entire cultivation unit is counteracted; the support lines and the cultivation lines are always maintained under tension. Moreover, the central internal ring also serves as a guide for the central support rope and thus prevents abrasion of the cultivation lines by the central support rope. Furthermore, it may be advantageous to provide at the central internal ring an eyelet for each radial support line. Thus, the support lines may be securely fastened at the center of the external ring without an interfering and hard to handle knot being formed. Furthermore, in this manner lines may easily be exchanged as needed. The actual center of the cultivation unit remains free for penetration by the central support rope. A simple means of attachment also results, in accordance with a next embodiment of the invention, from each radial support line being attached to an eyelet of a sleeve at the external ring. The sleeve may thus serve to attach not only one radial support line only, but also, at the same time, a pair of crow's foot ropes. Furthermore, each radial support line may advantageously be connected to an eyelet of the center internal ring by a tension element. In this manner it is possible to provide in a simple manner for a lasting tension in the entire cultivation unit which does not interfere with the operation under changing load conditions, for instance by an increased growth of algae, changing current conditions or while positioning or retrieving the support device.

In accordance with a further advantageous embodiment of the invention, the central crow's foot ring of the upper crow's foot may be connected to the central buoyancy means either directly or through an intermediate sinking line of determinable length. While the concept of the first variant is a very compact supporting device of particularly easy operability, the second variant makes possible height-variable positioning of the ring structure in the water column below the water surface. For this purpose the distance between the buoyancy means and the upper crow's foot ring is lengthened or shortened by providing a correspondingly long or lengthened or shortened sinking line. A low-hanging ring structure is favorable for cultivating young algae for in this manner the hazardous strong UV light is filtered through the superposed water column. In addition, in deeper layers of water the orbital movements of the water particles are weaker and thus prevent the tearing away of the young algae in case of strong waves. Once the algae are larger the ring structure may for purposes of better light absorption be suspended further up in the anchoring arrangement.

As a further advantage, the excellent nutrient supply as a result of the unimpeded rotation of the entire support device in the water current has already been referred to. For this purpose it is advantageous in accordance with a further embodiment of the invention to connect the lower crow's foot to the anchor chain connected to the anchor stone by means of a freely rotatably rotary coupling. In this manner free rotation of the ring structure over a single-point bottom anchoring is made possible free of ropes untwisting and reset forces. In accordance with a further embodiment of the invention, all upper crow's foot ropes may be of the same length. This ensures a horizontal suspension of the ring structure during hoisting and facilitates maintenance work as well as harvesting. Reference has already been made to the expedient possibility of connecting the support lines and crow's foot lines to appropriate eyelets on sleeves and the central internal ring. This can be still further improved by, in accordance with another improvement of the invention, by structuring all rope, line and chain connections as eyelets at the ends of all ropes, lines and chains. In this manner, knobs of undefined conditions of length and which are difficult to form and to loosen are avoided. The ropes, lines and chains may be re-used without any problems and without loss of length.

Advantageously, the external ring can be made to be especially strong by forming it from a steel cable encased by a plastic tube. Following insertion and closure of the steel cable the plastic tube may be closed by an appropriate sleeve. The diameter of the external ring can be easily defined without sacrificing the strength of the ring structure. Positioning and retrieving of the support device are made particularly easy by providing, in accordance with a further embodiment of the invention, an eyelet on the central buoyancy means for hoisting and lowering the support device. This would avoid the need for special rope connections at appropriate positions. Hoisting and lowering of the entire support device in the axis central to the anchoring device which makes for a particularly low load on the ring structure are made possible in a simple and reliable manner. Finally, the yield of cultivated Macro organisms may be improved by advantageously interconnecting a plurality of identical ring structures. In such an arrangement, every ring structure would be of identical construction with a central vertical direct connection between buoyancy means and anchoring. A connection between the external rings can be provided by appropriate releasable eyelet connectors.

DESCRIPTION OF THE SEVERAL DRAWINGS

The novel features which are deemed to be characteristic of the invention are set forth with particularity in the appended claims. The invention itself, however, in respect of its structure, construction, lay-out and design, as well as manufacturing techniques and technology, together with other objects and advantages thereof will be best understood from the following description of the preferred embodiments when read with reference to the appended drawings, in which:

DETAILED DESCRIPTION OF THE PREFERRED EMBODIMENTS

Figure 1:
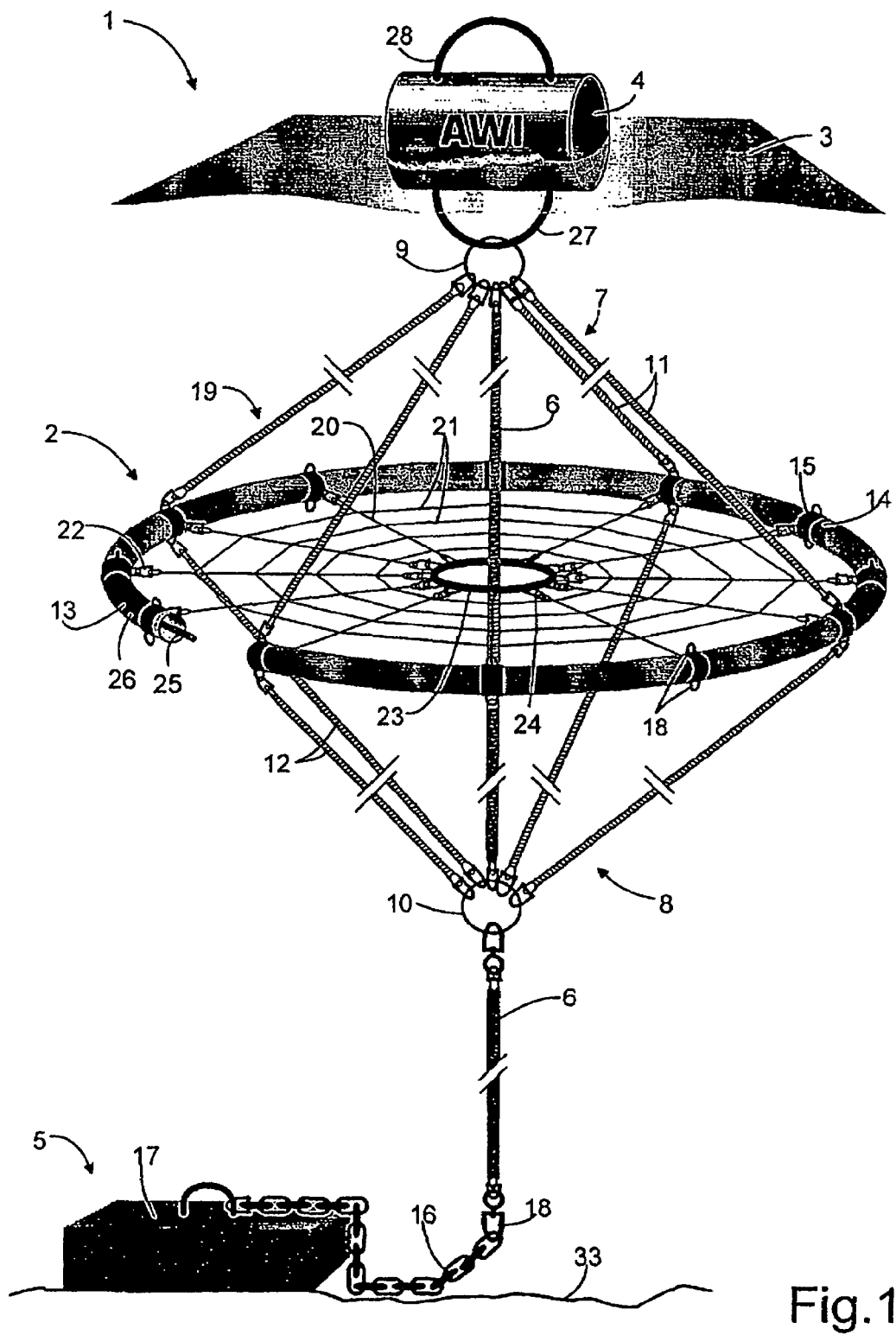
FIG. 1 is a perspective overall view of the support device.

FIG. 1 depicts a possible embodiment of a support device 1 according to the invention for cultivating Macro organisms, e.g. algae, in marine waters. The support device 1 is provided with a ring structure 2 disposed below the surface 3 of the water at a changeable depth position. To this end, the ring structure 2 is disposed between a buoyancy means 4 on the surface 3 of the water and an anchoring device 5 on the bed 33 of the water. To ensure that only the lowest possible forces, which may be caused by the water as well as by transport operations, affect the ring structure 2, it is disconnected from any direct force transfer path. To accomplish this, the buoyancy means 4 is connected directly to the anchoring device 5 by means of a central support rope 6 which may, for instance, be a steel cable. In this manner, the ring structure 2 can be retrieved free of any additional load forces, for instance by the anchoring device 5, and need support only the harvesting load of the cultivated Macro organisms.

The ring structure 2 is connected to the central support rope 6 by an upper crow's foot 7 and a lower crow's foot 8. To this end, each crow's foot 7, 8 is provided with a central crow's foot ring 9, 10 from which several upper and lower crow's foot ropes 11, 12 extend to an external ring 13 of the ring structure 2. In the embodiment shown there are four crow's foot ropes 11, 12 each. The length of the upper and lower crow's foot ropes 11, 12 and of the central support rope 6 is selectable (as indicated in FIG. 1 by interruptions) and is a function of the overall dimensions of the ring structure 2 which depend upon the utilitarian and operational overall dimensions of the support device 1. The crow's foot rope 11, 12 are evenly distributed on the eternal ring 13 so that the harvesting load in particular cannot cause unilateral disfigurations of the ring during hoisting, and the ring structure 2 is subjected to uniform tensile forces. The provision of common points 14 of engagement to each of which one of the upper and lower crow's foot ropes 11, 12 is connected, also provides for an expedient force distribution. Rigid sleeves 15 at the engagement points 14 provided with an eyelet 18 for each of the crow's foot ropes 11, 12 are used for an expedient and stable connection (see FIG. 2).

In the selected embodiment, the buoyancy means 4 is connected directly to the upper crow's foot ring 9 so that the ring structure 2 is set at the least submersion depth with the highest UV irradiation. To increase the submersion depth, a submersion rope (not shown in FIG. 1) dimensioned or adjustable to an appropriate length is interposed between the buoyancy means 4 and the upper crow's foot 7. To the lower crow's foot ring 10 there is attached another piece of the central support rope 6, the other end of which is connected to an anchor chain 16 leading to an anchor stone 17. In the selected embodiment, the anchor chain 16 and the anchor stone 17 constitute the anchoring device 5. Furthermore, all of the rope, line and chain connections are made of simple eyelets 18 which ensure expedient mounting and stable connections.

Within the external ring 13 of the ring structure 2 there is provided a cobwebby cultivation unit 19 for cultivating Macro organisms. It is made up of radial support lines 20 with azimuthal cultivation lines 21 extending between them in concentric rings. The lines may, for instance, be interconnected by knots or by cable connectors. Each of the radial support lines 20 is connected to the external ring 13 by a third eyelet 22 on a sleeve 19 (see FIG. 2). As may be seen in FIG. 1, only every third sleeve 15 on the external ring 13 serves simultaneously for fastening an upper and a lower crow's foot rope 11, 12. Other occupations and designs, for instance with sleeves 15 with different numbers of eyelets are possible as well. However, the arrangement shown is particularly advantageous since it requires only one kind of sleeve 15. The other end of the support lines 20 is connected to a central internal ring 23 which serves as a guide and unimpeded passage for the central support rope 6. For tightening the support lines 20, tensioning elements 24 are interposed in the selected embodiment (see FIG. 3) so that the entire cultivation unit 19 can always be maintained in a taut state. However, the support lines 20 may also be drawn tightly through the eyelets 29 directly and may then be spliced.

In the selected embodiment, the external ring 13 is constructed from a close steel cable 25 which extends within a closed plastic tube 26, for instance, of PE (shown broken away in FIG. 1). The external ring may be of a diameter of about 5 m and in the embodiment described it is of expedient stability. Furthermore, the buoyancy means 4 is shown to be shaped like a buoy and is provided with a lower eyelet 27 for attaching the central support rope 6 and an upper eyelet 28 for simple hoisting and lowering of the support device.

Figure 2:
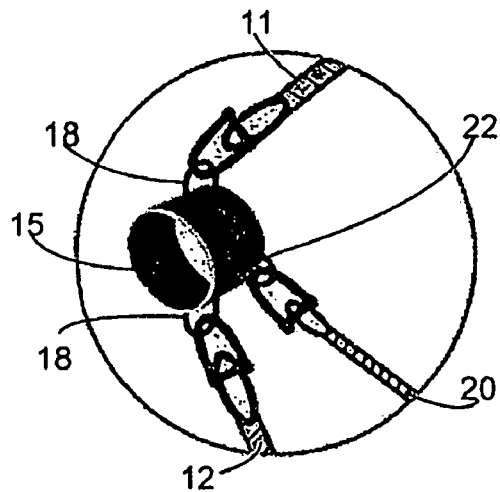
FIG. 2 is a perspective detailed view of a sleeve.

FIG. 2 depicts a detailed view of a sleeve 15 provided with three eyelets 16, 22. The two eyelets 16 and the eyelet 22 respectively serve to attach at the external ring 13 the upper and lower crow's foot ropes 11, 12 and the radial support line 20. The shown sleeve 15 is closed and made of steel; the eyelets 16, 22 are welded to it. A rigid design of plastic is possible as well.

Figure 3:
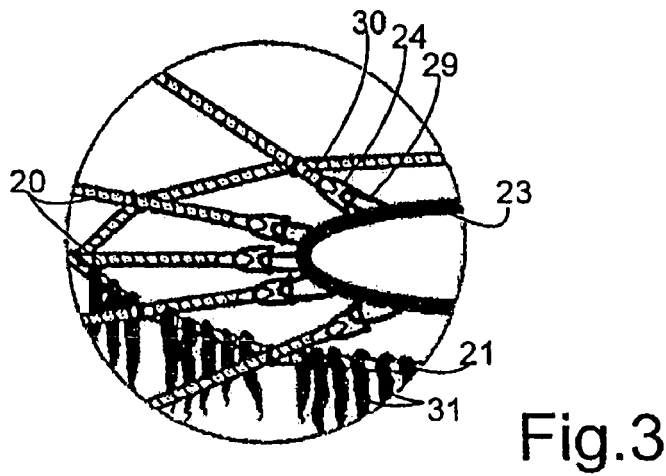
FIG. 3 is a perspective detailed view of the central internal rings.

FIG. 3 depicts a detailed view of the central internal ring 23 including the radial support lines 20 of the cultivation unit 19 attached to it by eyelets 29, 30. The central internal ring 23 is also made of stainless steel and is provided with an eyelet 29 for each radial support line 20. Tensioning elements 24, for instance simple tension or coil springs, are arranged between the eyelets 29, 30 for maintaining the support lines 20 and, therefore, the entire cultivation unit in a taut state. Laminar algae growth 31 on the cultivation lines 21 has been indicated in FIG. 3.

Figure 4:
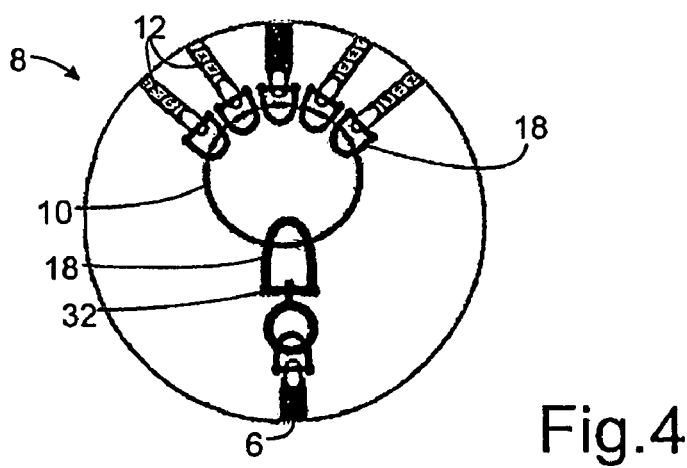
FIG. 4 is a perspective detailed view of the lower crow's foot connection to the central support rope.

Finally, FIG. 4 depicts a detailed view of the lower crow's foot 8. The lower crow's foot ropes 12 and the central support rope 6 are connected to the central crow's foot ring 10 by upper eyelets 18. The central crow's foot ring 10 is connected to a lower section of the central support rope 6 by a lower eyelet 18 and a freely rotatable coupling 32. Such an arrangement of eyelet 18 and rotary coupling 32 may also be provided between the support rope 6 and the anchor chain 16 (see FIG. 1), so that the entire structural ring 2 may freely rotate in the current.

The above-described embodiments of the support device in accordance with the invention are examples only. Embodiments designed differently are possible within the ambit of the disclosure and are embraced by the disclosure.

What is claimed is:

1. A support device for cultivating macro organisms in marine waters, comprising:
   a first ring defining a plane of predetermined diameter;
   a second ring of a lesser diameter positioned substantially in the plane;
   a plurality of radially disposed support lines connecting the first and second rings;
   a plurality of cultivation lines substantially concentrically arranged between the first and second rings and connected to the support lines;
   buoyancy means;
   anchoring means;
   a first crow's foot comprising a third ring disposed above the plane and a plurality of first ropes connected to the third ring and the first ring;
   a second crow's foot comprising a fourth ring disposed below the plane and a plurality of second ropes connected to the fourth ring and the first ring;
   an elongated support member connected to the third and fourth rings and extending through the second ring;
   means for connecting the third ring to the buoyancy means; and
   means for connecting the fourth ring to the anchoring means.

2. The support device of claim 1, wherein the first ring is provided with a plurality of sleeves evenly spaced from each other around the periphery of the first ring.

3. The support device of claim 2, wherein the sleeves are provided with at least one eyelet each.

4. The support device of claim 3, wherein the second ring is provided with an eyelet for each of the support lines.

5. The support device of claim 4, wherein each support line is provided with an eyelet at each end for connection with an eyelet on the second ring and an eyelet of a sleeve.

6. The support device of claim 3, wherein the plurality of first ropes is less than the plurality of support lines and wherein the first ropes extend at substantially equal angles from each other from the third ring to predetermined sleeves.

7. The support device of claim 6, wherein the first ropes are provided with an eyelet at each end for connection to the third ring and an eyelet on a sleeve.

8. The support device of claim 7, wherein the third ring is provided with a plurality of eyelets equal to the plurality of first ropes.

9. The support device of claim 7, wherein the second ropes are provided with an eyelet at each end for connection to the forth ring and an eyelet on a sleeve.

10. The support device of claim 9, wherein the fourth ring is provided with a plurality of eyelets equal to the plurality of second ropes.

11. The support device of claim 3, wherein the plurality of second ropes is less than the plurality of the support lines and wherein the second ropes extend at substantially equal angles from each other from the fourth ring to predetermined sleeves.

12. The support device of claim 3, wherein an eyelet of predetermined sleeves is connected to one first and one second rope.

13. The support device of claim 3, wherein an eyelet of every sleeve is connected to a support line.

14. The support device of claim 1, wherein each support line is provided with tension means.

15. The support device of claim 1, wherein each first and second rope is provided with tension means.

16. The support device of claim 1, wherein the first and second ropes are longer than the support lines.

17. The support device of claim 1, wherein the first and second ropes are of equal length.

18. The support device of claim 1, wherein the anchoring means comprises an anchor stone and an anchor chain and wherein the means for connecting the fourth ring to the anchoring means comprises a rotary coupling between the fourth ring and the anchor chain.

19. The support device of claim 1, wherein the first ring comprises an external plastic tube provided therein with a steel cable ring.

20. The support device of claim 1, wherein the buoyancy means is provided with means for connecting to motion-imparting means.

* * * * *